(12) United States Patent
Boyadjieff et al.

(10) Patent No.: US 7,768,221 B2
(45) Date of Patent: Aug. 3, 2010

(54) METHOD, SYSTEM, AND APPARATUS FOR CONTROLLING AN ELECTRIC MOTOR

(75) Inventors: George I. Boyadjieff, Villa Park, CA (US); John J. Hurst, Henderson, NV (US)

(73) Assignee: Power Efficiency Corporation, Las Vegas, NV (US)

( * ) Notice: Subject to any disclaimer, the term of this patent is extended or adjusted under 35 U.S.C. 154(b) by 103 days.

(21) Appl. No.: 11/755,627

(22) Filed: May 30, 2007

(65) Prior Publication Data

US 2007/0290645 A1 Dec. 20, 2007

Related U.S. Application Data

(60) Provisional application No. 60/803,849, filed on Jun. 2, 2006.

(51) Int. Cl.
  *H02K 23/00* (2006.01)
(52) U.S. Cl. ........................ 318/437; 318/729
(58) Field of Classification Search .............. 318/729, 318/437
  See application file for complete search history.

(56) References Cited

U.S. PATENT DOCUMENTS

| | | | |
|---|---|---|---|
| 3,913,002 A | | 10/1975 | Steigerwald et al. |
| 4,052,648 A | * | 10/1977 | Nola .......................... 318/810 |
| 4,266,177 A | | 5/1981 | Nola |
| 4,379,258 A | | 4/1983 | Sugimoto |
| 4,384,243 A | | 5/1983 | Muskovac |
| 4,388,578 A | * | 6/1983 | Green et al. ................ 318/729 |
| 4,404,511 A | | 9/1983 | Nola |
| 4,454,462 A | * | 6/1984 | Spann ........................ 318/729 |
| 4,459,528 A | * | 7/1984 | Nola ........................... 318/729 |
| 4,618,805 A | | 10/1986 | Hornung |
| 4,710,692 A | | 12/1987 | Libert et al. |
| 4,771,224 A | | 9/1988 | Elms |
| 4,833,386 A | | 5/1989 | Unsworth |
| 4,833,628 A | | 5/1989 | Curran, Jr. |
| 4,855,653 A | | 8/1989 | Lemirande |

(Continued)

FOREIGN PATENT DOCUMENTS

JP  2004-351492  12/2004

(Continued)

*Primary Examiner*—Bentsu Ro
*Assistant Examiner*—David S Luo
(74) *Attorney, Agent, or Firm*—Birch, Stewart, Kolasch & Birch, LLP

(57) ABSTRACT

The present invention provides systems and methods for power factor control of a motor. A phase detector uses a line voltage of a power supply and a motor terminal voltage of a motor. The output of the phase detector is synchronized to a zero crossing of the motor current of the motor and a zero crossing of the line voltage. A digital microprocessor connected between the output of the phase detector and a rectifier driver senses a first time at which a phase of the motor voltage is crossing zero volts and a second time at which a phase of the motor current is crossing zero current. The digital microprocessor calculates the difference in time between the first and second times and uses the difference in time to calculate a phase lag of the motor. The digital microprocessor uses the phase lag to calculate a firing time of a rectifier to command power efficiently to the motor.

20 Claims, 6 Drawing Sheets

U.S. PATENT DOCUMENTS

| | | | |
|---|---|---|---|
| 4,878,010 A | 10/1989 | Weber | |
| 4,912,390 A | 3/1990 | Curran, Jr. et al. | |
| 4,928,055 A | 5/1990 | Kaieda et al. | |
| 4,935,684 A | 6/1990 | Watanabe | |
| 4,939,632 A | 7/1990 | Plagge et al. | |
| 4,950,970 A | 8/1990 | Davis, Jr. et al. | |
| 5,006,973 A | 4/1991 | Turner | |
| 5,017,855 A | 5/1991 | Byers et al. | |
| 5,038,091 A | 8/1991 | Bashark | |
| 5,075,610 A | 12/1991 | Harris | |
| 5,140,243 A | 8/1992 | Lyons et al. | |
| 5,200,684 A | 4/1993 | Fisher | |
| 5,204,606 A | 4/1993 | Kuwahara et al. | |
| 5,239,250 A | 8/1993 | Kalman et al. | |
| 5,241,256 A | 8/1993 | Hatanaka et al. | |
| 5,428,283 A | 6/1995 | Kalman et al. | |
| 5,469,045 A | 11/1995 | Dove et al. | |
| 5,548,197 A | 8/1996 | Unsworth et al. | |
| 5,637,975 A * | 6/1997 | Pummer et al. | 318/729 |
| 5,708,608 A | 1/1998 | Park et al. | |
| 5,723,966 A | 3/1998 | Straka et al. | |
| 5,736,838 A | 4/1998 | Dove et al. | |
| 5,777,833 A | 7/1998 | Romillon | |
| 5,801,459 A | 9/1998 | Angquist | |
| 5,821,726 A * | 10/1998 | Anderson | 318/809 |
| 6,281,658 B1 | 8/2001 | Han et al. | |
| 6,380,708 B1 * | 4/2002 | Gritter et al. | 318/778 |
| 6,400,119 B1 | 6/2002 | Garza et al. | |
| 6,489,742 B2 | 12/2002 | Lumsden | |
| 6,507,167 B2 | 1/2003 | Han et al. | |
| 6,559,619 B1 | 5/2003 | Bach | |
| 6,636,011 B2 | 10/2003 | Sadasivam et al. | |
| 6,667,596 B1 | 12/2003 | Griepentrog et al. | |
| 6,801,005 B2 | 10/2004 | Charleston | |
| 6,914,398 B2 | 7/2005 | Ohlsson et al. | |
| 7,019,498 B2 | 3/2006 | Pippin et al. | |

FOREIGN PATENT DOCUMENTS

| | | |
|---|---|---|
| JP | 2005-227795 | 8/2005 |
| WO | WO 80/02895 | 12/1980 |

* cited by examiner

100

METHOD, SYSTEM, AND APPARATUS FOR CONTROLLING AN ELECTRIC MOTOR

RELATED APPLICATIONS

This non-provisional patent application claims priority to, and the benefit of, U.S. Provisional Patent Application No. 60/803,849, entitled "Method, System and Apparatus For Controlling An Electric Motor", filed Jun. 2, 2006, the entire contents of which is hereby incorporated by reference.

FIELD

The present invention relates generally to appliances and equipment utilizing an electrical motor, and is more particularly related to methods, systems, and apparatus for controlling an electric motor for the conservation of energy.

BACKGROUND

Power factor measures the ratio of average power to the apparent power in an electrical load. Power factor ranges from a value of 0 (where the impedance of the load is purely reactive) to 1 (for a purely resistive load). In practice, the power factor of electrical devices ranges somewhere between 0 and 1, and the closer this value is to unity, the more efficiently energy is consumed by the device and the less power is wasted. Therefore, for consumers of electricity that employ highly reactive loads (e.g. electrical induction motors), it is desirable that steps be taken to adjust the power factor of their apparent load to improve performance and avoid wasting enormous amounts of power. For example, a mill that consumes 100 kW from a 220-V line with a power factor of 0.85 will require 118 kW of apparent power supplied. But if the power factor is improved to 0.95, the apparent power supplied drops to 105.3 kW. Many utility companies require such consumers to take affirmative steps to adjust power factor.

Large factories are not the only environments to benefit from improvement in power factor. AC motors are present in many different electrical appliances and equipment from compressors to elevators, and since they are usually inductive in their input impedance, they often present a less than desirable power factor rating, especially under light load conditions or during certain periods of load variance. To improve the power factor in AC motors, controllers have been developed and are generally known in the art. Examples include U.S. Pat. No. 4,459,528, entitled "Phase Detector for Three-Phase Power Factor Controller" (Nola '528); U.S. Pat. No. 4,266,177, entitled "Power Factor Control System for AC Induction Motors" (Nola '177); and U.S. Pat. No. 5,821,726 entitled "Balanced and Synchronized Phase Detector for an AC Induction Motor Controller" (Anderson); all of which are hereby incorporated by reference.

In general, the power factor mitigation approach taken by many AC motor controllers is accomplished by sensing the phase difference between the current and voltage phasors and then using a controller to adjust the actuation of thyristors in each AC motor phase to attempt to reduce the voltage and current phase lag. In an ideal implementation, if the phase between the current and voltage phasors can be brought to zero, the load looks resistive to the power supply, and therefore, the power factor would approach unity. While unity power factor is not entirely practically achievable, small improvements in power factor can make substantial differences in power consumption.

Many different approaches to improving power factor in electrical motors have been developed over the years. For instance, U.S. Pat. No. 4,052,648 (entitled "Power Factor Control System for AC Induction Motors" (Nola '648)) describes a power reduction system for less than fully loaded induction motors, which is hereby incorporated by reference. The phase angle between current and voltage (motor power factor) is controlled. In the Nola '648 system, the motor power factor is controlled as a function of the difference between a commanded power factor signal and the operating power factor through control of thyristors connected to the motor.

U.S. Pat. No. 4,266,177, entitled "Power Factor Control System for AC Induction Motors" (Nola '177), is a system adapted to respond to conditions where motor loads are abruptly changed (e.g., by increasing the speed of full motor voltage turn-on). In the Nola '177 system, a phase comparison is made by combining the voltage and current derived square wave signals and generating a series of pulses equal in time width to the phase angle between motor current and voltage. The variable width of the pulse is changed to a variable-amplitude DC signal whose amplitude is proportional to the phase difference. The phase difference signal is compared with a command voltage signal representing a desired minimum power factor of operation. The resulting difference signal, a circuit error signal, is then used to control the on time of a triac in series with the winding of the induction motor to maintain motor operation at the selected power factor. This has the effect of significantly reducing the power input to a less than fully loaded motor.

Inherent in changing these pulses into a DC signal is the necessity to filter the pulses to produce a smooth DC signal. This is accomplished, for instance, by using an analog integrator. Analog integrators, by their very nature, can create a time lag between the actual change in phase angle and the change the controller sees. This lag can be quite significant compared to the motor's ability to respond to a change in load. As a result, designs such as those shown in U.S. Pat. No. 4,266,177 may require additional circuitry to cancel this time lag during periods where the motor's load suddenly increases.

U.S. Pat. No. 5,821,726 addresses the response to large increases in motor load. The speed of response to a change from lightly loaded to fully load conditions could be inadequate to prevent motor stalling or vibrations, especially when the minimum power factor command setting is relatively high. For example, although the Nola system(s) responded fairly quickly, further improvements could be made to respond to large abrupt load changes such as those in oil well pumps, motor generator sets, stamping machines, refrigerator compressors, and the like.

The filtering of the pulse train to create a smooth DC signal can compromise the response of the controller. High efficiency motors connected to controllers may also enter into undesirable periods of excessive vibration due to the controller's inability to respond to these high efficiency motors.

It would be desirable to provide a fast responding controller that has the capability to improve the control of the phase lag in induction motors and hence the amount of energy saved. It would also be desirable to provide a controller that is capable of working with a broad variety of electrical appliances that contain induction motors thereby improving power factor and start-up characteristics. It would also be desirable to provide a power factor improving controller that is programmable and may be customized to particular loads and operating conditions.

SUMMARY

The present invention provides systems and methods for control of a motor. A phase detector is coupled to a power supply. The output of the phase detector is synchronized to a zero crossing of a motor current of the motor and a zero crossing of the line voltage. A digital microprocessor coupled between the output of the phase detector and a rectifier driver senses a first time at which a phase of the motor voltage is crossing zero volts and a second time at which a phase of the motor current is crossing zero current. The digital microprocessor determines the difference in time between the first and second times and uses the difference in time to calculate a phase lag of the motor. The digital microprocessor uses the phase lag to calculate a firing time of a rectifier to command power efficiently to the motor.

BRIEF DESCRIPTION OF DRAWING FIGURES

DETAILED DESCRIPTION

The present invention includes a controller system having a digital microprocessor to provide power factor adjustment in motors.

Figure 1:
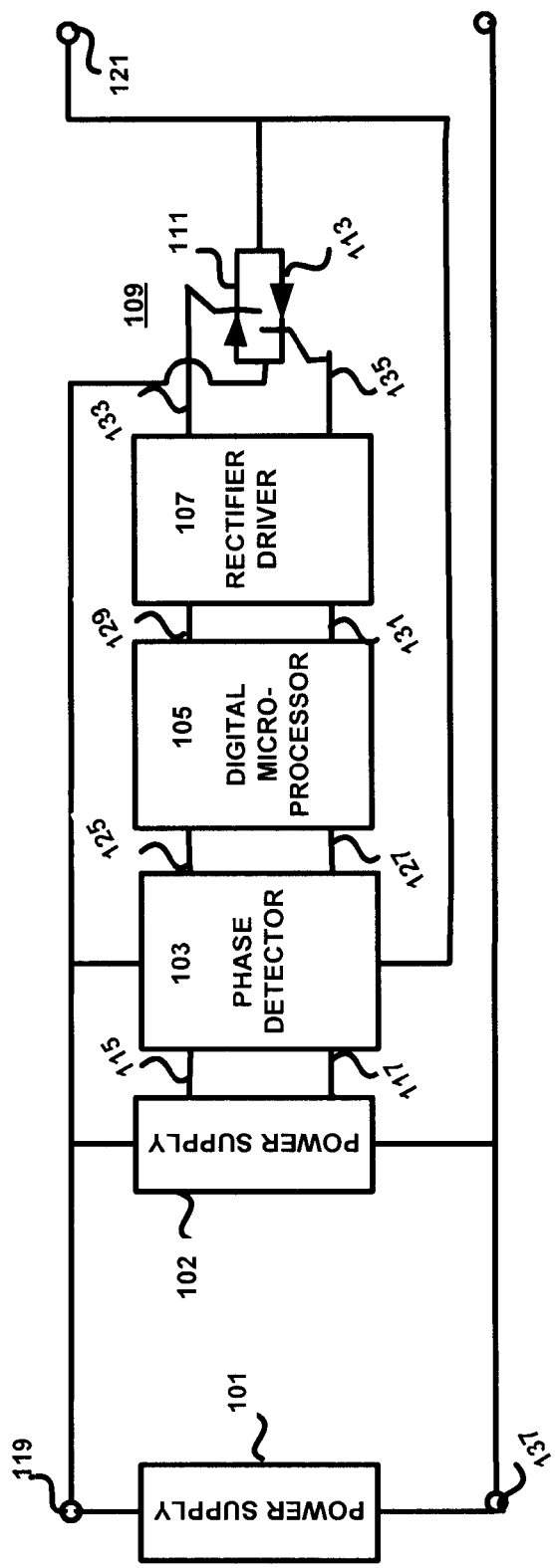
FIG. 1 is a block level diagram illustrating a controller system for a motor in accordance with an exemplary embodiment of the present invention.

Referring to FIG. 1, an exemplary block diagram-level embodiment is illustrated for a control system 100 to improve efficiency of the operation of a motor (not shown) by controlling the power factor of the motor. While a single phase implementation (e.g., single-phase motor) is illustrated, those of skill in the art appreciate that multiple stages may be used to control multi-phase motors (such as three-phase motors).

The system 100 includes a power supply 101, a power supply 102, a phase detector 103, a digital microprocessor 105, a rectifier driver 107, and a rectifier 109. The power supply 101 is connected to the phase detector 103 to provide a line voltage 119 via a first phase detector input to the phase detector 103 and the power supply 101 is also connected to a ground 137. The phase detector 103 is also coupled to a motor terminal voltage 121 of the motor via a second phase detector input. The phase detector 103 is coupled to the digital microprocessor 105 to provide signals synchronized to a zero crossing of the motor current and a zero crossing of the line voltage 119 to the digital microprocessor 105. The digital microprocessor 105 uses the synchronized signals to calculate a phase lag of the motor, and hence, the firing time of the rectifier driver 107. The rectifier driver 107 fires or turns on the rectifier 109 to command power to the motor.

A second power supply 102 provides a lower level of the line voltage 119 and motor terminal voltage 121 into the phase detector 103, where the lower levels of the line voltage 119 and the motor terminal voltage 121 of the motor are coupled respectively to an input 115 (e.g., +15 Volts) and an input 117 (e.g., −15 Volts) of the phase detector 103. The line voltage 119 is also coupled to an input to the rectifier 109. The first phase detector output 125 is synchronized to a zero crossing of the motor current and the second phase detector output 127 is synchronized to a zero crossing of the line voltage 119. The first and second phase detector outputs of the phase detector 103 are coupled to the digital microprocessor 105. The digital microprocessor 105 senses a first time at which a phase of the motor voltage is crossing zero volts and a second time at which a phase of the motor current is crossing zero current. Since the digital microprocessor 105 has an internal clock, the digital microprocessor 105 easily determines the first and second times. The digital microprocessor 105 determines the difference in time between the first and second times and uses the difference in time to calculate a phase lag of the motor. The digital microprocessor 105 uses the phase lag to calculate a firing time of the rectifier 109. The firing time varies with at least one of the phase lag and a load of the motor.

A first and second output 129 and 131 of the digital microprocessor 105 are respectively coupled to a first and second input 133 and 135 of the rectifier driver 107 (e.g., a Silicon Controlled Rectifier (SCR) driver). The first and second outputs 129 and 131 are synchronized to the zero voltage crossing from the phase detector 103. The rectifier driver 107 may be of modern design or similar to those used in the Nola and Anderson controllers (discussed above) and may drive any type of thyristors such as SCRs and triacs. The rectifier driver 107 controls one or more rectifiers 109 (such as one or more thyristors 111 and 113 (illustrated in the Nola and Anderson controllers discussed above)). The rectifier driver 107 fires the rectifier 109, so that the motor terminal voltage 121 will be provided to the motor.

Using the digital microprocessor 105 to determine the motor's phase lag between voltage and current and control the rectifier driver 107 permits the controller system 100 to decrease the phase lag of the motor, which substantially maximizes the power factor. Thus, the digital microprocessor 105 can accurately calculate the phase lag of the motor, and hence, the firing of the rectifier 109 to efficiently supply power to the motor.

Figure 2:
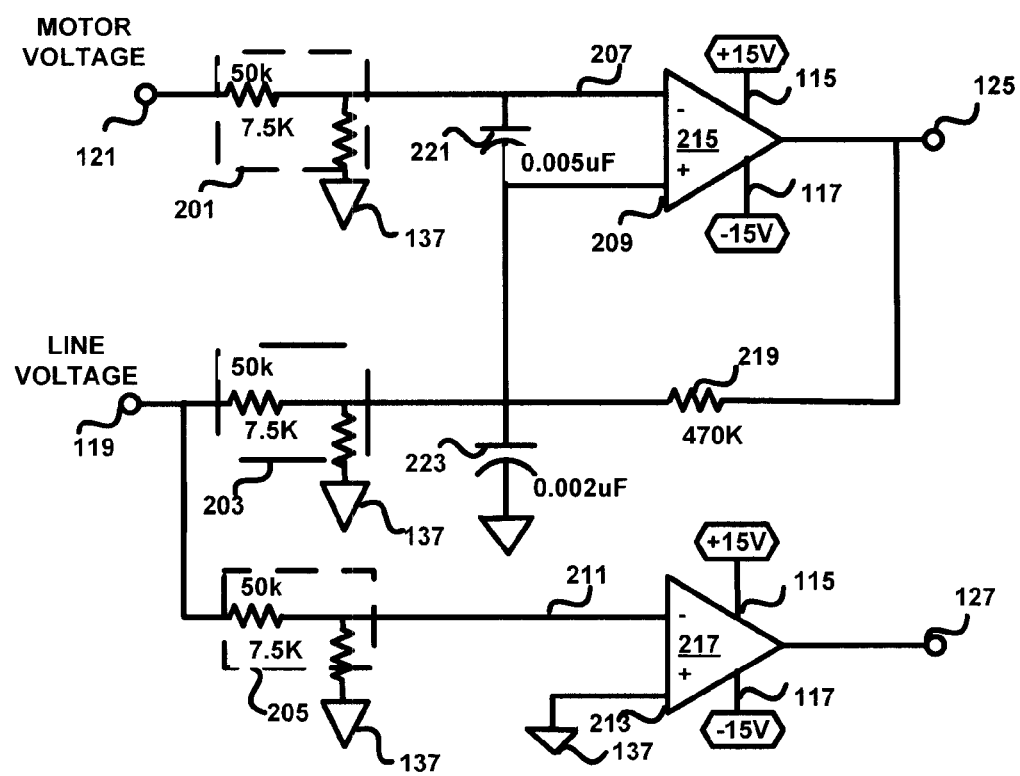
FIG. 2 is a schematic of a phase detection circuit (PDC) in accordance with an exemplary embodiment of the present invention.

FIG. 2 illustrates the phase detector 103. Phase detector 103 can be an analog circuit (e.g., such as the phase detectors used in the Nola and Anderson controllers). The phase detector 103 includes one or more voltage dividers to provide voltage and current input and one or more operational amplifiers for amplification and conversion of the voltage and current waveforms into square waves. The motor terminal voltage 121 is coupled to a first inverting input 207 of a first operational amplifier 215 (also referred to as U1) via a first voltage divider 201. The line voltage 119 is coupled to a first non-inverting input 209 of the first operational amplifier 215 via a second voltage divider 203 and a second inverting input 211 of a second operational amplifier 217 (also referred to as U2) via a third voltage divider. A second non-inverting input of the second operational amplifier 217 is coupled to ground 137.

The voltage dividers, such as those illustrated with the 50 K ohm and 7.5 K ohm resistors, reduce the voltage from a power supply voltage level of the motor to an operational amplifier level(s). While these particular resistor values illustrate an exemplary embodiment, those of skill in the art clearly recognize that differing amounts of voltage adjustment or resistor values may be used depending on the operating environment. Differing or additional filter components may be provided to further condition the input signals of the first and second operational amplifiers 215 and 217. The first voltage divider 201 obtains input from the motor terminal voltage 121 and it feeds to the inverting terminal of the first operational amplifier 215. The second voltage divider 203 obtains input from the line voltage 119 and feeds to the non-inverting terminal of the first operational amplifier 215. The third voltage divider circuit obtains its input from the line voltage 119 and provides a signal to the second operational amplifier 217.

A capacitor 221 is coupled between the inverting terminal and the non-inverting terminal of the first operational amplifier 215. A capacitor 223 is coupled between the non-inverting terminal of the first operational amplifier 215 and the ground 137. Capacitors 221 and 223 filter noise from the line voltage 119 and the motor terminal voltage 121.

The first operational amplifier 215 compares the motor terminal voltage 121 to the line voltage 119. The first operational amplifier 215 is configured with a positive feedback via a resistor 219 (such as the 470 K ohm resistor illustrated). The positive feedback causes the first operational amplifier 215 to act as a comparator with hysteresis. A first amplifier output (the first phase detector output 125) of the first operational amplifier 215 is a square wave synchronized to the phase lag of the motor current. A second amplifier output (the second phase detector output 127) of the second operational amplifier 217 operates as square wave generator that produces square waves synchronized to the zero crossings of the line voltage 119. The first amplifier output 125 of the first operational amplifier 215 is synchronized to a zero crossing of the motor current and the second amplifier output 127 of the second operational amplifier 217 is synchronized to a zero crossing of the line voltage 119.

Alternatively, the first voltage divider 201 can be replaced by a current transducer (not shown). The current transducer also replaces the resistor 219 and the second voltage divider 203 coupled to the first operational amplifier 215. As such, the current transducer can measure the zero crossing of the current of the motor.

The digital microprocessor 105 is coupled between the phase detector output of the first and second amplifier outputs 125 and 127 and the rectifier driver 107. The digital microprocessor 105 determines a phase lag (e.g., a phase angle difference) of the current and voltage of the motor by calculating the time difference between a switching state of the first operational amplifier 215 and a switching state of the second operational amplifier 217, which produces an instantaneous signal of phase lag. The phase lag is used in order to control the firing of the rectifier driver 107. Thus, the firing of the rectifier driver 107 fires the rectifier 109 to supply power to the motor.

Figure 3:
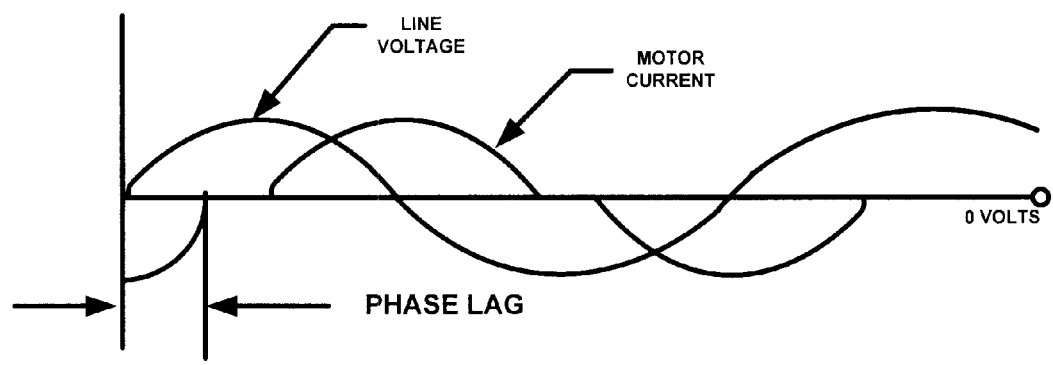
FIG. 3 is the waveform input and output of the PDC seen in FIG. 2.
Figure 3:
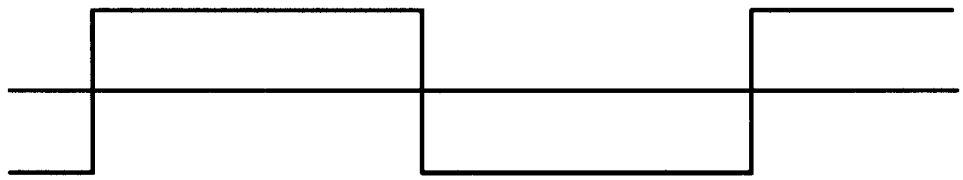
Figure 3:
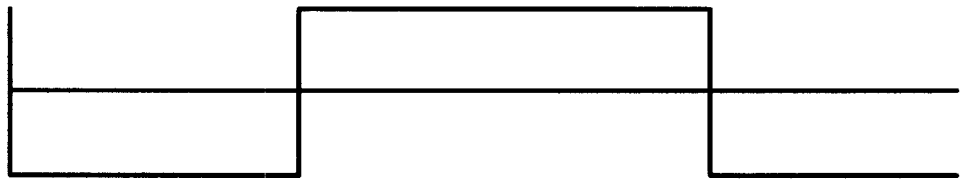

FIG. 3 illustrates nominal waveforms for the line voltage 119 and the motor current produced by the output of the system 100 together with the corresponding outputs of the first and second operational amplifiers 215 and 217.

To understand how phase is detected, it is helpful to consider the output of the first operational amplifier 215. When the thyristors 111 and 113 are switched off (zero motor voltage), the difference between the inverting and non-inverting terminals of the first operational amplifier 215 is equal to the line voltage 119 sensed. However, when the thyristors III and 113 are turned on, the voltage difference between the line and motor terminals will be very low. When the sensed line voltage 119 (non-inverting input) is greater than the sensed motor voltage (inverting input), the output of the first operational amplifier 215 is +15 volts. This occurs, for example, during the positive half-cycle of line voltage 119 when the thyristors 111 and 113 are off indicated by zero current. The positive output of the first operational amplifier 215 combined with the positive feedback increases the line voltage 119 sensed, such that the first operational amplifier 215 will not change state until the sensed motor voltage (inverting input) is significantly greater than the sensed line voltage 119. This does not occur until the thyristors 111 and 113 are again off during the negative half cycle of line voltage 119. Therefore, the output of the first operational amplifier 215 will be positive from the time the thyristors 111 and 113 turn off on the positive half-cycle of line voltage 119 until the thyristors 111 and 113 again turn off on the negative half-cycle of line voltage 119. This waveform is illustrated in FIG. 3 as the first operational amplifier 215.

The second operational amplifier 217, on the other hand, senses only the line voltage 119 and changes state from positive to negative as the line voltage 119 changes from positive to negative.

Consequently, the digital microprocessor 105 (or a microcontroller or digital signal processor) can be used to determine the phase angle by calculating the time difference between the switching state of the first operational amplifier 215 and the switching state of the second operational amplifier 217. This produces an instantaneous signal of phase angle. The phase detection algorithm is:

$$\gamma = (T1 - T2) \times K \qquad \text{Equation No. 1}$$

Where T1=time current crosses zero
T2=time voltage crosses zero
K=360 degrees divided by the time of one voltage cycle in milliseconds for the difference between T1 and T2 expressed in milliseconds
γ=phase lag in degrees The phase lag is used to calculate the firing (on and off times) of the thyristors 111 and 113.

The digital microprocessor 105 (or a microcontroller or digital signal processor) can be used to determine a phase error signal associated with the phase lag by calculating the time difference between the switching state of the first operational amplifier 215 and the switching state of the second operational amplifier 217. The phase error detection algorithm is:

$$(\theta_D - \theta_{FB}) \times K = \lambda \qquad \text{Equation No. 2}$$

Where $\theta_D$=desired phase angle in milliseconds
$\theta_{FB}$=zero crossing time of motor current minus zero crossing time of motor voltage in milliseconds
K=360 degrees divided by the time of one voltage cycle in milliseconds (e.g., for 60 cycle voltage, 360 degrees is divided by a time 16.667 milliseconds)
λ=phase error signal in degrees While K in Equation No. 1 is expressed in time (more generally), K in Equation No. 2 is expressed in milliseconds. The phase error signal is used in system 100 to control the firing (on and off times) of the thyristors 111 and 113.

Figure 4:
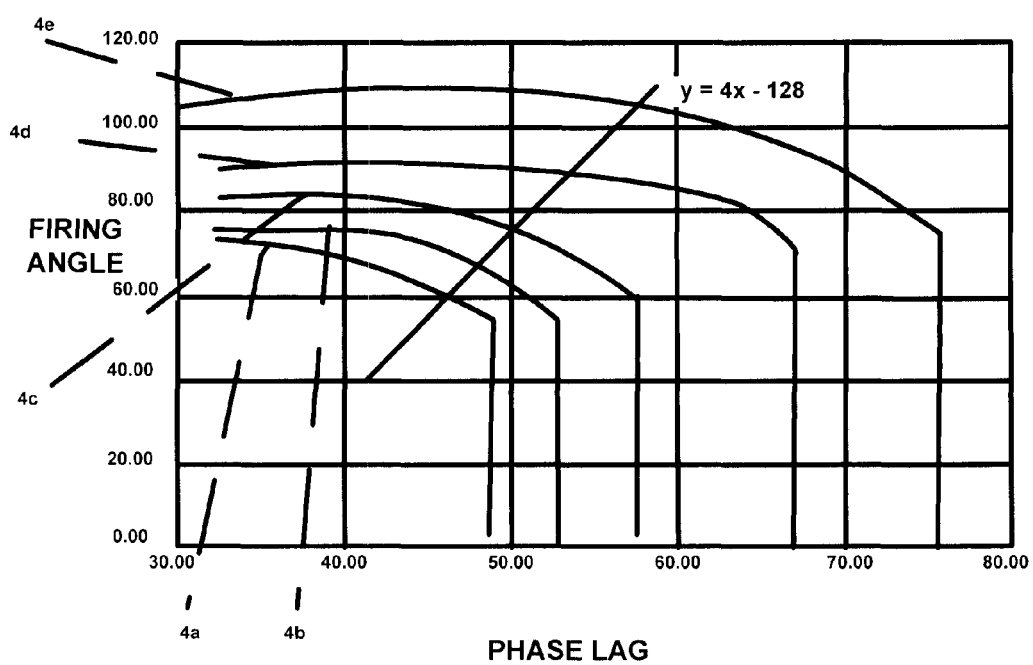
FIG. 4 is a set of motor curves relating phase angle to firing angle of the depicted thyristors in accordance with an exemplary embodiment of the present invention.

For example, FIG. 4 depicts curves 4a through 4e as a typical set of motor characteristics relating phase angle to when thyristors 111 and 113 are turned back on, a time referred to as the firing angle. Illustrated in FIG. 4 is a straight line extending upward and to the right, where an equation describing this line is:

$$y = Ax - B \qquad \text{Equation No. 3}$$

Where x=the measured phase angle (which can be γ in Equation No. 1)
A=the gain (e.g., the gain is 4 in FIG. 4)
B=an offset ((e.g., the offset is 128 in FIG. 4)
y=the firing angle Curve 4a, with a vertical portion having a phase lag of about 50 degrees is shown for a fully loaded motor (100%); whereas, the curve 4e with the vertical portion having a phase lag of about 75 degrees is illustrated for an unloaded motor (0%). The curves in between (at 4b, 4c, and 4d) are illustrative of motor loads in between the fully loaded and unloaded motor operational ranges (75%, 50%, and 25% loaded, respectively).

In an exemplary embodiment in curves 4a through 4e, the thyristor 111 (or thyristor 113) is commanded to turn off at a zero voltage crossing. However, because there is current passing through thyristor 111, thyristor 111 cannot turn off until this current goes to zero. At some time after the zero voltage crossing, this current goes to zero (e.g., the phase lag time). At this time, the thyristor 111 turns off (unless thyristor 111 was commanded to fire on by the controller system 100 before this zero current crossing). If thyristor 111 was commanded to fire on by the controller system 100 before this zero current crossing, then thyristor 111 stays on. When the firing time is less than the phase lag time, the thyristor 111 stays on and the phase lag stays constant.

For firing times greater than the phase lag, the thyristor 111 will turn off at the zero current crossing (phase lag) and back on at the firing time. This will cause the motor to receive zero volts while the thyristor 111 is off. The average voltage over the full cycle will be lower and the phase lag will be less (i.e., higher power factor). By increasing the firing time above the point where phase and firing time are equal at a given load, the curves 4a through 4e of FIG. 4 are generated. Curves 4a through 4e represent the motor's characteristics or the relationship of phase to firing time for the motor.

For example, it is desirable to have close to full voltage for full load, as in curve 4a, and minimum phase lag for no load, as in curve 4e. In this example, the system 100 outputs a firing angle of about 50 degrees at full load, in curve 4a, and about 110 degrees at no load, in curve 4e. Unfortunately, firing at 110 degrees for no load, the motor shuts down because the motor does not have enough voltage to run. At a firing angle of 100 degrees and no load, the phase will be about 57 degrees, and at a firing angle of 55 degrees the phase will be about 46 degrees. Using these two points, the desired firing angle can be calculated (e.g., using Equation No. 3). For a load of curve 4d, the system 100 will fire where the line represented by Equation No. 3 crosses the curve 4d. The system 100 controls the motor at the intersection of the line represented by Equation No. 3 and the current load curve. When the load changes, the phase angle moves to the new intersection of the new load curve and the line represented by Equation No. 3. This is closed loop feedback control in that as the input (which is phase) changes, the output changes automatically. Equation No. 3 can be adjusted by those skilled in the art using closed loop feedback control principles to stabilize the system 100. For example, if Equation No. 3 approached a vertical straight line (where y=20x−1000), the feedback control system of the motor would be unstable.

Equation No. 3 describes one exemplary embodiment of an algorithm for controlling the phase angle of the motor of the system 100. The algorithm for controlling the phase angle may be adjusted by varying the constant 128 and the gain 4. One exemplary implementation of the algorithm for controlling the phase angle is illustrated in FIG. 5.

Figure 5:
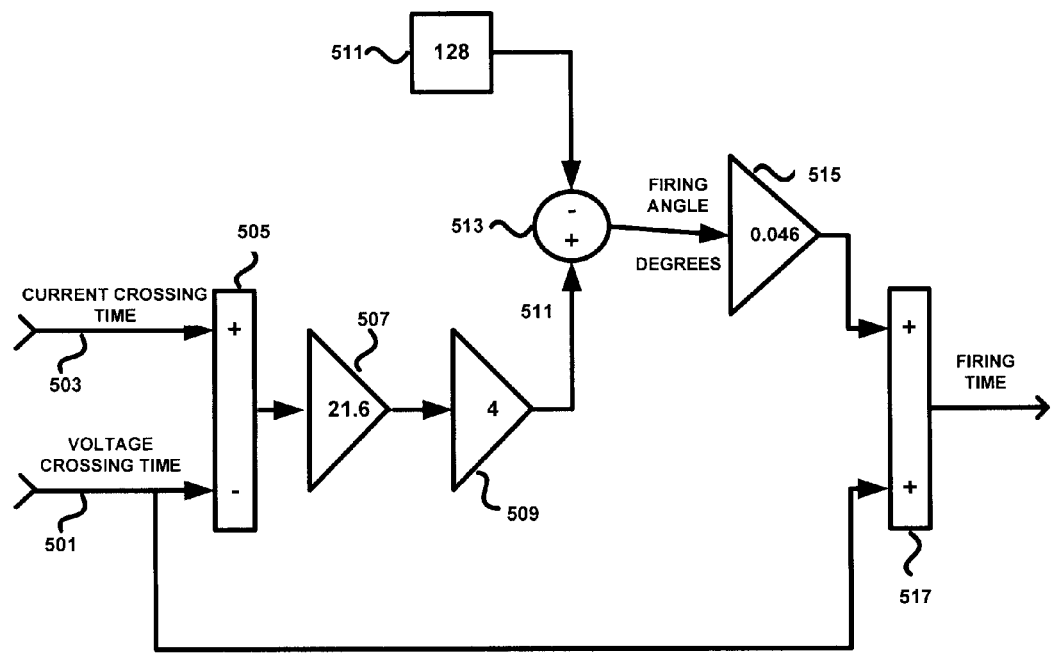
FIG. 5 is a block level diagram of a controller system algorithm in accordance with an exemplary embodiment of the present invention.

FIG. 5 illustrates a block diagram for one embodiment of the phase angle control algorithm implemented in the digital microprocessor 105 illustrated in FIG. 1. The phase angle control algorithm may be adjusted by varying the constant 128 and the gain 4, such as in Equation No. 3. Put another way, the exemplary embodiment in FIG. 5 calculates the firing time in milliseconds in part by solving Equation No. 3, but various other equations can be used. System 100 controls the firing of the thyristors 111 and 113 by using the digital microprocessor 105 to calculate a time derived phase angle (e.g., the output of step 505 in FIG. 5 and Equation No. 1) and uses this phase angle in the digital microprocessor 105 to calculate a thyristor firing time using Equation No. 3.

For example, a zero crossing time of the voltage of the motor is calculated by the digital microprocessor 105 (such as in milliseconds) (step 501). A zero crossing time of the current of the motor is calculated by the digital microprocessor 105 (such as in milliseconds) (step 503). The digital microprocessor 105 calculates the difference in time between the zero crossing times of the motor current and motor voltage (step 505). This difference in time is used to calculate a phase lag between the voltage and current of the motor (e.g., difference in time multiplied by 21.6 degrees/milliseconds) (step 507). The digital microprocessor 105 multiplies this phase lag by a gain (e.g., 4 from Equation No. 3) (step 509). The digital microprocessor 105 uses this phase lag from step 509 with an offset (e.g., subtract 128 degrees from the phase lag from step 509) (step 511) to calculate a firing angle of the rectifier driver 107 (e.g., a firing angle in degrees) (step 513). The offset of 128 degrees comes from Equation No. 3. The digital microprocessor 105 uses the firing angle from step 513 and multiplies it by 0.046 (step 515) to convert the firing angle from degrees to milliseconds. The firing angle in milliseconds is used with the zero crossing time of the voltage of the motor to calculate the firing time of the rectifier driver 107 (e.g., such as in milliseconds) (step 517).

One voltage sine wave is 360 degrees and 0 degrees is at the zero crossing. A firing angle of 90 degrees occurs at the peak of such a sine wave. The firing time is in milliseconds. For a 60 cycle AC voltage, one sine wave is 16⅔ milliseconds from start to finish. For a firing angle of 90 degrees, the firing time is ¼ of 16⅔ milliseconds (or 4.166 milliseconds). The 21.6 degrees/milliseconds comes from 360 degrees divided by 16⅔ milliseconds. The 0.046 comes from 16⅔ milliseconds divided by 360 degrees.

It can be appreciated that those skilled in the art may modify the numbers associated with the algorithm as well as the elements of the system 100 such as adding a Proportional Integral Differential (PID) controller or other similar control devices to optimize the system 100 and compensate for instability if desired. Thus, use of the aforementioned approach along with the improved detection of phase lag (power factor) using the digital microprocessor 105 is one exemplary embodiment of the present invention.

Figure 6:
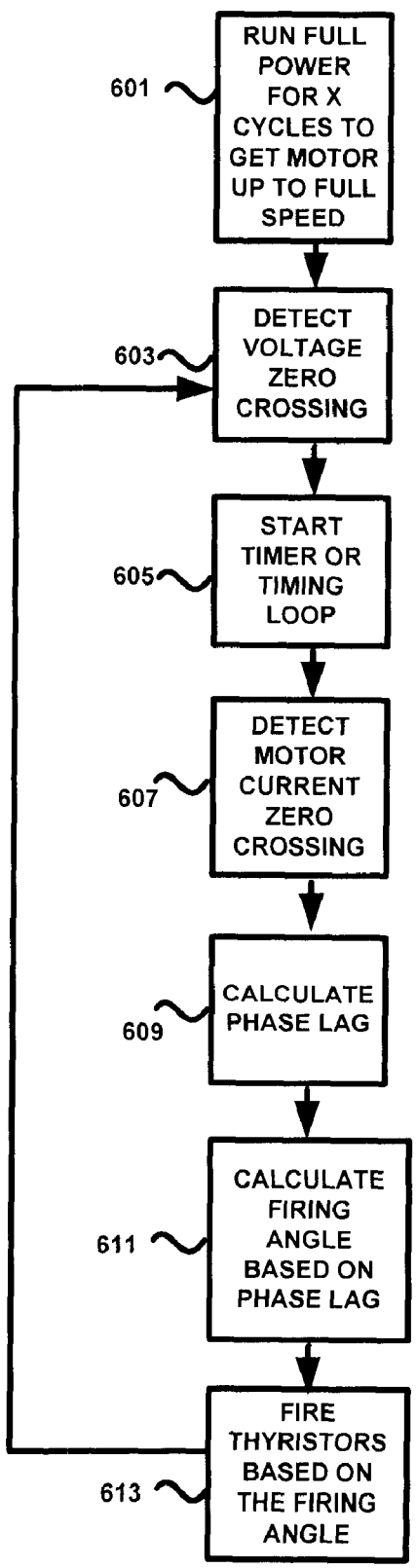
FIG. 6 is a flowchart illustrating a method for controlling a motor in accordance with an exemplary embodiment of the present invention.

FIG. 6 illustrates a method for power factor control of a motor including sensing the zero crossings of the voltage and current of the motor to determine a time difference to calculate a phase lag of the motor. This method includes running the power of the motor fully for a number of cycles (X) to get the motor up to full operating speed (step 601). A determination is made to detect a zero crossing of the voltage of the motor (step 603). Using the digital microprocessor 105, a first time at which a phase of the motor voltage is crossing zero volts is sensed. A timer or timing loop in the digital microprocessor 105 is started upon detecting the zero voltage crossing of the voltage of the motor (step 605). A determination is made to detect a zero crossing of the current of the motor (step 607). Using the digital microprocessor 105, a second time at which a phase of the motor current is crossing zero current is sensed. The first and second times are used to calculate the phase lag of the motor (step 609). Using the digital microprocessor 105, the difference in time between the first and second times is determined. Using the digital microprocessor 105, the difference in time is used to calculate a phase lag of the motor. The firing angle is calculated based on the phase lag of the motor (step 611). The firing angle determines when to fire the rectifier driver 107, and consequently the rectifier 111 (step 613). Steps 603 through 613 are repeated to provide power factor control of the motor by sensing the zero crossings of the voltage and current of the motor to determine the time difference to calculate the phase lag of the motor. Thus, using the digital microprocessor 105, the phase lag is used to calculate a firing time of a rectifier 109, where the firing time varies with at least one of the phase lag and a load of the motor.

The present invention has been described with reference to specific exemplary embodiments. However, it will be appreciated that various modifications and changes can be made without departing from the scope of the present invention. The specification and figures are to be regarded in an illustrative manner, rather than a restrictive one, and all such modifications are intended to be included within the scope of present invention.

Benefits, other advantages, and solutions to problems have been described above with regard to specific exemplary embodiments. However, the benefits, advantages, solutions to problems, and any element(s) that may cause any benefit, advantage, or solution to occur or become more pronounced are not to be construed as critical, required, or essential features or elements. As used herein, the terms "comprises", "comprising", "including", or any variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention, unless expressly described as "essential" or "critical".

What is claimed is:

1. A system, comprising:
   a power supply;
   a phase detector coupled to the power supply, said phase detector having
      a first phase detector output, said first phase detector output being synchronized to a zero crossing of a motor current; and
      a second phase detector output; said second phase detector output being synchronized to a zero crossing of a line voltage of said power supply;
   a rectifier; and
   a digital microprocessor connected to the first and second phase detector outputs and the rectifier;
      said digital microprocessor
      sensing a first time at which a phase of the line voltage crosses zero;
      sensing a second time at which a phase of the motor current crosses zero;
      calculating a difference between the first and second times;
      calculating a phase lag of the motor based on said difference; and
      calculating a firing time of the rectifier based on said phase lag.

2. The system of claim 1, wherein the phase lag is calculated using the following equation:

$$\gamma = (T1 - T2) * K$$

wherein $\gamma$ is the phase lag in degrees,
T1 is the time current crosses zero,
T2 is the time voltage crosses zero, and
K is 360 degrees divided by the time of one voltage cycle in milliseconds for the difference between T1 and T2 expressed in milliseconds.

3. The system of claim 2, wherein the firing time of the rectifier is calculated using the following equation:

$$y = A\gamma - B$$

wherein $\gamma$ is the firing time, A is the gain, and B is an offset.

4. The system of claim 1, wherein a phase error signal associated with the phase lag is calculated using the following equation:

$$\lambda = (\theta_D - \theta_{FB}) * K$$

wherein $\lambda$ is the phase error signal,
$\theta_D$ is a desired phase angle in milliseconds,
$\theta_{FB}$ is the second time at which a phase of the motor current is crossing zero minus the first time at which a phase of the motor voltage is crossing zero in milliseconds, and
K is 360 degrees divided by the time of one voltage cycle in milliseconds.

5. The system of claim 1, wherein the firing time of the rectifier is calculated using the following equation:

$$y = Ax - B$$

wherein y is the firing time,
A is the gain,
B is an offset, and
x is a measured phase angle of the motor.

6. The system of claim 1, wherein the firing time varies with at least one of the phase lag and a load of the motor.

7. The system of claim 1, wherein the phase detector includes a first phase detector input coupled to a line voltage of the power supply and a second phase detector input coupled to a motor terminal voltage of the motor.

8. A system, comprising:
   a power supply;
   a phase detector coupled to said power supply, the phase detector having
      a first phase detector input coupled to a first non-inverting input of a first operational amplifier via a second voltage divider and a second inverting input of a second operational amplifier via a third voltage divider,
      a second phase detector input coupled to the first inverting input of the first operational amplifier via a first voltage divider, and
      a phase detector output that includes an output of the first operational amplifier and an output of the second operational amplifier,
   wherein the first amplifier output is synchronized to a zero crossing of the motor current and the second amplifier output is synchronized to a zero crossing of the line voltage; and
   a digital microprocessor coupled between the phase detector output and a rectifier driver, wherein the digital microprocessor determines a phase lag of the current and voltage of the motor by calculating the time difference between a switching state of the first operational amplifier and a switching state of the second operational amplifier, and calculates, based on the determined phase lag, a firing time for the rectifier driver.

9. The system of claim 8, wherein the rectifier driver fires at least one thyristor coupled between the rectifier driver and the motor terminal voltage of the motor.

10. The system of claim 8, wherein the phase lag is calculated using the following equation:

$$\gamma = (T1 - T2) * K$$

wherein $\gamma$ is the phase lag in degrees,
T1 is the time current crosses zero,
T2 is the time voltage crosses zero, and
K is 360 degrees divided by the time of one voltage cycle in milliseconds for the difference between T1 and T2 expressed in milliseconds.

11. The system of claim 10, wherein the firing of the rectifier is calculated using the following equation:

$$y = A\gamma - B$$

wherein $\gamma$ is a firing time, A is the gain, and B is an offset.

12. The system of claim 8, wherein the phase lag is calculated using the following equation:

$$\lambda = (\theta_D - \theta_{FB}) * K$$

wherein $\lambda$ is the phase lag,
$\theta_D$ is a desired phase angle in milliseconds,
$\theta_{FB}$ is the second time at which a phase of the motor current is crossing zero minus the first time at which a voltage phase of the motor is crossing zero in milliseconds, and
K is 360 degrees divided by the time of one voltage cycle in milliseconds.

13. The system of claim 8, wherein the firing of the rectifier is calculated using the following equation:

$$y = Ax - B$$

wherein y is a firing time associated with the firing of the rectifier, A is the gain, B is an offset, and x is a measured phase angle of the motor.

14. A method for control of a motor, comprising the steps of:
using a digital microprocessor, sensing a first time at which a phase of the motor voltage is crossing zero;
using a digital microprocessor, sensing a second time at which a phase of the motor current is crossing zero;
using a digital microprocessor, determining the difference in time between the first and second times;
using a digital microprocessor, using the difference in time to calculate a phase lag of the motor; and
using a digital microprocessor, using the phase lag to calculate a firing time of a rectifier.

15. The method of claim 14, further comprising starting a timer in the digital microprocessor upon sensing a first time at which a phase of the motor voltage is crossing zero volts.

16. The method of claim 14, further comprising the step of calculating the phase lag using the following equation:

$$\gamma = (T1 - T2) * K$$

wherein $\gamma$ is the phase lag in degrees,
T1 is the time current crosses zero,
T2 is the time voltage crosses zero, and
K is 360 degrees divided by the time of one voltage cycle in milliseconds for the difference between T1 and T2 expressed in milliseconds.

17. The method of claim 16, further comprising the step of calculating the firing time of the rectifier using the following equation:

$$y = A\gamma - B$$

wherein $\gamma$ is the firing time, A is the gain, and B is an offset.

18. The method of claim 14, further comprising the step of varying the firing time with at least one of the phase lag and a load of the motor.

19. The method of claim 14, wherein the firing time of the rectifier is calculated using the following equation:

$$y = Ax - B$$

wherein y is the firing time associated with the firing of the rectifier, A is the gain, B is an offset, and x is a measured phase angle of the motor.

20. The method of claim 14, further comprising the step of calculating a phase lag error associated with the phase lag using the following equation:

$$\lambda = (\theta_D - \theta_{FB}) * K$$

wherein $\lambda$ is the phase lag,
$\theta_D$ is a desired phase angle in milliseconds,
$\theta_{FB}$ is the second time at which a phase of the motor current is crossing zero minus the first time at which a phase of the motor voltage is crossing zero in milliseconds, and
K is 360 degrees divided by the time of one voltage cycle in milliseconds.

* * * * *